Figure 1:
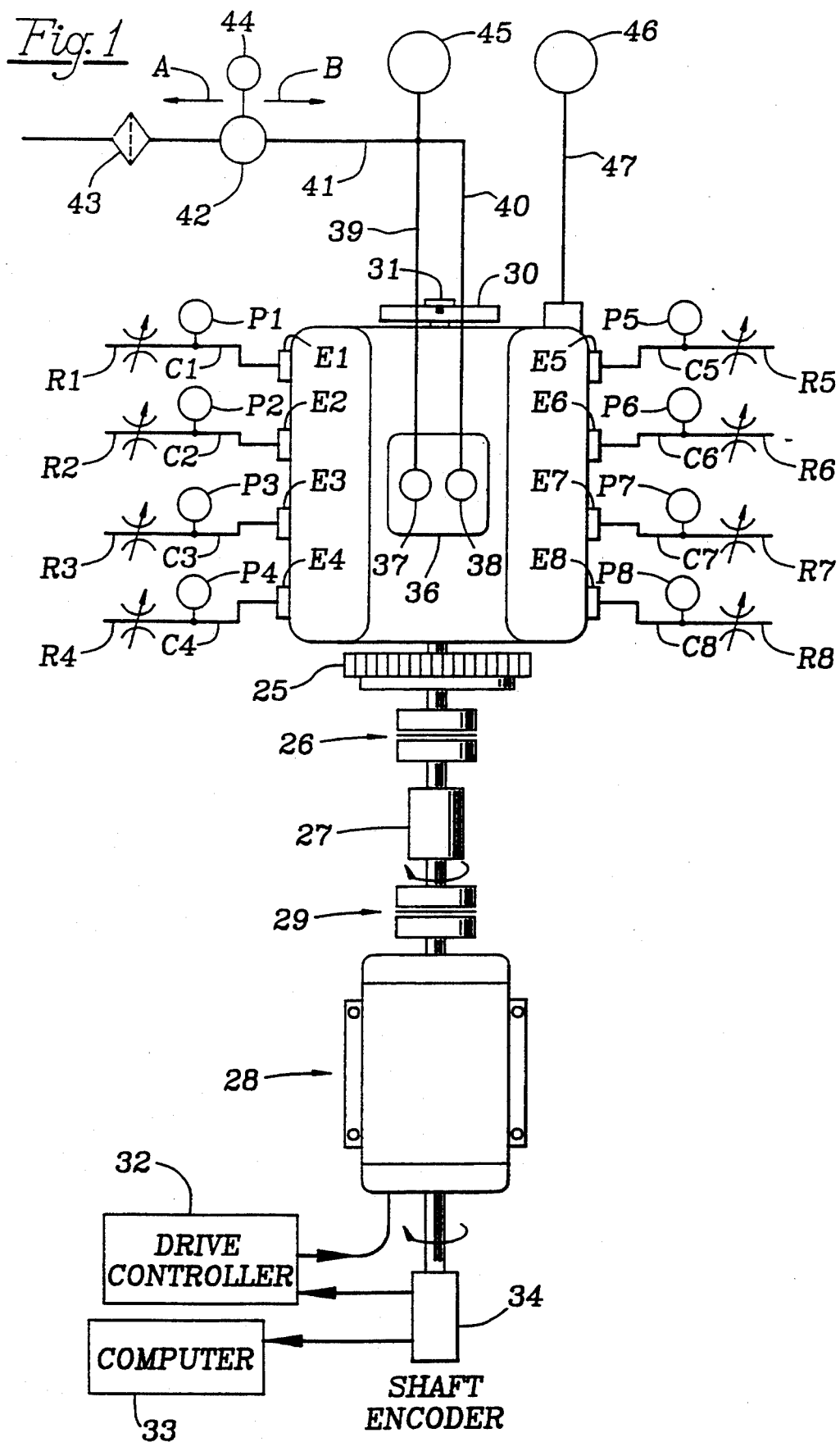

United States Patent [19]

Scourtes

[11] Patent Number: 5,417,109

[45] Date of Patent: May 23, 1995

[54] METHODS AND APPARATUS FOR TESTING ENGINES

[75] Inventor: George Scourtes, Clearwater, Fla.

[73] Assignee: Lucas Automation & Control Engineering, Inc., Reston, Va.

[21] Appl. No.: 129,449

[22] Filed: Sep. 30, 1993

[51] Int. Cl.⁶ .......................................... G01M 15/00
[52] U.S. Cl. ............................................ 73/116; 73/47; 73/115
[58] Field of Search ................... 73/47, 49.7, 115, 116, 73/117.1, 117.2, 117.3, 118.1

[56] References Cited

U.S. PATENT DOCUMENTS

| 574,964 | 1/1897 | Waldner | 73/115 |
|---|---|---|---|
| 620,182 | 2/1899 | Ripper | 73/115 |
| 1,464,817 | 8/1923 | Hammett | 73/47 |
| 1,570,520 | 1/1926 | Oehrli | 73/116 |
| 2,212,466 | 8/1940 | Bradford | 73/47 |
| 3,121,335 | 2/1964 | Ongaro | 73/462 |
| 3,443,440 | 5/1969 | Porter | 73/462 |
| 3,616,686 | 11/1971 | Lash | 73/116 |
| 3,633,410 | 1/1972 | Kolpino | 73/116 |
| 4,030,350 | 6/1977 | Bier | 73/117.1 |
| 4,174,627 | 11/1979 | Swis | 73/116 |
| 4,343,348 | 8/1982 | Scourtes | 73/118.1 |
| 4,348,893 | 9/1982 | Hendrix et al. | 73/116 |
| 4,370,884 | 2/1983 | Wöss et al. | 73/116 |
| 4,448,063 | 5/1984 | Mudge et al. | 73/117.2 |
| 4,457,165 | 7/1984 | Wiederrich | 73/116 |
| 4,574,620 | 3/1986 | Cohl | 73/47 |

FOREIGN PATENT DOCUMENTS

| 1939854 | 2/1970 | Germany | 73/47 |
|---|---|---|---|
| 1455254 | 1/1989 | U.S.S.R. | 73/47 |

Primary Examiner—Richard E. Chilcot, Jr.
Assistant Examiner—George M. Dombroske
Attorney, Agent, or Firm—Learman & McCulloch

[57] ABSTRACT

Methods and apparatus are disclosed for testing an internal combustion engine having one or more cylinders each of which has a reciprocable piston which defines a variable volume combustion chamber in communication with intake and exhaust ports that are opened and closed by intake and exhaust valves, respectively. The combustion chamber of each cylinder is either evacuated or pressurized, depending upon the tests to be performed, to establish in such chamber a negative or positive pressure relative to ambient pressure, and such negative or positive pressure is maintained, while the associated piston is reciprocated. The opening and closing of the valves in conjunction with reciprocation of the associated piston causes pressure pulses to be generated which are sensed and analyzed.

40 Claims, 2 Drawing Sheets

METHODS AND APPARATUS FOR TESTING ENGINES

This invention relates to methods and apparatus for testing engines and more particularly for the testing of an internal combustion engine having at least one cylinder within which is a reciprocating piston and which is equipped with intake and exhaust valves.

BACKGROUND OF THE INVENTION

It is conventional to test automotive and other internal combustion engines either by driving the engine under its own power or by connecting the crankshaft of the engine to an electric or other driving motor which enables the rotary and reciprocatory parts of the engine under test to be driven.

Testing of an engine that is operated under its own power requires the use of some mechanism, such as a dynamometer, for the imposition of loads on the engine. The dynamometer conventionally is either an A.C. or D.C. generator or prony brake. The necessity of using a dynamometer increases the cost and time required to test an engine.

The testing of an engine while it is being operated under its own power enables a number of tests to be performed, such as horsepower output, fuel consumption, exhaust emissions, and the like. However, the operation of an engine under its own power requires the provision of means to supply fuel, coolant, lubrication, and noise abatement apparatus. In addition, the operation of an engine under its own power necessitates the provision of elaborate ventilation systems to accommodate the engine exhaust.

Although the testing of an engine operating under its own power enables a good many desirable tests to be performed, the integrity tests that can be imposed on the valve train, camshaft, crankshaft, engine block, and head are limited because of the engine's tendency to stall when the load on the engine is increased beyond the level that the engine can accommodate. In addition, certain defects, such as faulty valves and piston rings, are not always detectable during operation of the engine at relatively low operating speeds, unless the faults are of substantial proportions.

Driving an engine by some means other than under its own power is known as motoring the engine. Motoring of an engine does not enable tests such as horsepower output, fuel consumption, exhaust emissions, and the like to be performed, but a great many other tests can be performed by motoring the engine. Motoring the engine also dispenses with the need for fuel storage and delivery systems and obviates the need for exhaust ventilation systems.

SUMMARY OF THE INVENTION

An internal combustion engine may be tested in accordance with the invention by motoring the engine by means of an electric or other motor that is coupled to the drive shaft of the engine under test. While the engine is motored the cylinders selectively may be maintained in an evacuated or pressurized condition relative to ambient pressure, thereby enabling a good many tests to be performed which cannot be performed when the engine is operated under its own power. For example, the flow of exhaust gas from the exhaust port of each cylinder can be restricted or completely prevented by a restricter downstream of the exhaust port, thereby enabling one or more pressure sensors to monitor the pressure wave form signal created by air trapped between the exhaust port and the restricter. This enables, among other things, valve leaks to be detected at low motoring speeds of the engine with a sensitivity of a few cc/min. In contrast, an engine operating under its own power requires unrestricted flow of exhaust gas discharged from the exhaust port to enable the exhaust gas to escape. Consequently an engine operating under its own power can tolerate leaks of several hundred cc/min without any detectable performance loss. It is desirable to detect such subtle engine defects because, even though they may not materially affect performance while the engine is new, they eventually will shorten the engine's service life.

Evacuating a cylinder not only enables valve tests to be performed, but many other functions as well. For example, evacuating a cylinder enables the performance of the piston compression and oil rings to be checked. If the vacuum causes oil to be sucked up from the crankcase, then obviously the oil ring is defective.

Evacuating the cylinder also makes it unnecessary to remove a spark plug, thereby avoiding the accidental introduction of foreign matter into the cylinder.

Evacuating a cylinder also enables the making of a much more accurate measurement of the friction of the engine than otherwise is possible. By evacuating the cylinder, the air/fuel compression part of the work load during cranking of the engine is eliminated. By eliminating such compressive load, the torque measured during cranking of the engine is due solely to friction of the moving parts.

Pressurizing a cylinder dispenses with the need for a dynamometer and still enables information to be obtained in respect of the integrity and durability of the cylinder block, cylinder head, bearings, connecting rods, and all other rotating and reciprocating parts. Pressurization also enables the performance of the compression piston rings to be evaluated, as well as the detection of missing or broken piston rings.

Apparatus according to the invention is particularly adapted for testing an automotive or other engine having a reciprocable piston accommodated in a cylinder in communication with which are an inlet port, an exhaust port, and valve means for respectively opening and closing such ports. The apparatus includes means for selectively pressurizing and evacuating the cylinder and variable valve or restricter means for enabling, disabling, and regulating the rate of flow of air into and out of the cylinder via the exhaust port.

One method of testing the engine according to the invention is to restrict or wholly disable the flow of air through the exhaust port and maintain a subatmospheric pressure in the cylinder while reciprocating the piston.

Another testing method is to restrict or disable the flow of air outwardly of the cylinder through the exhaust port and maintain the cylinder at superatmospheric pressure during reciprocation of the piston.

In each method the opening and closing of the intake and exhaust valves as the piston is reciprocated will produce pressure change pulses or signals which may be detected and analyzed to obtain data concerning the performance of the engine.

THE DRAWINGS

Figure 2:
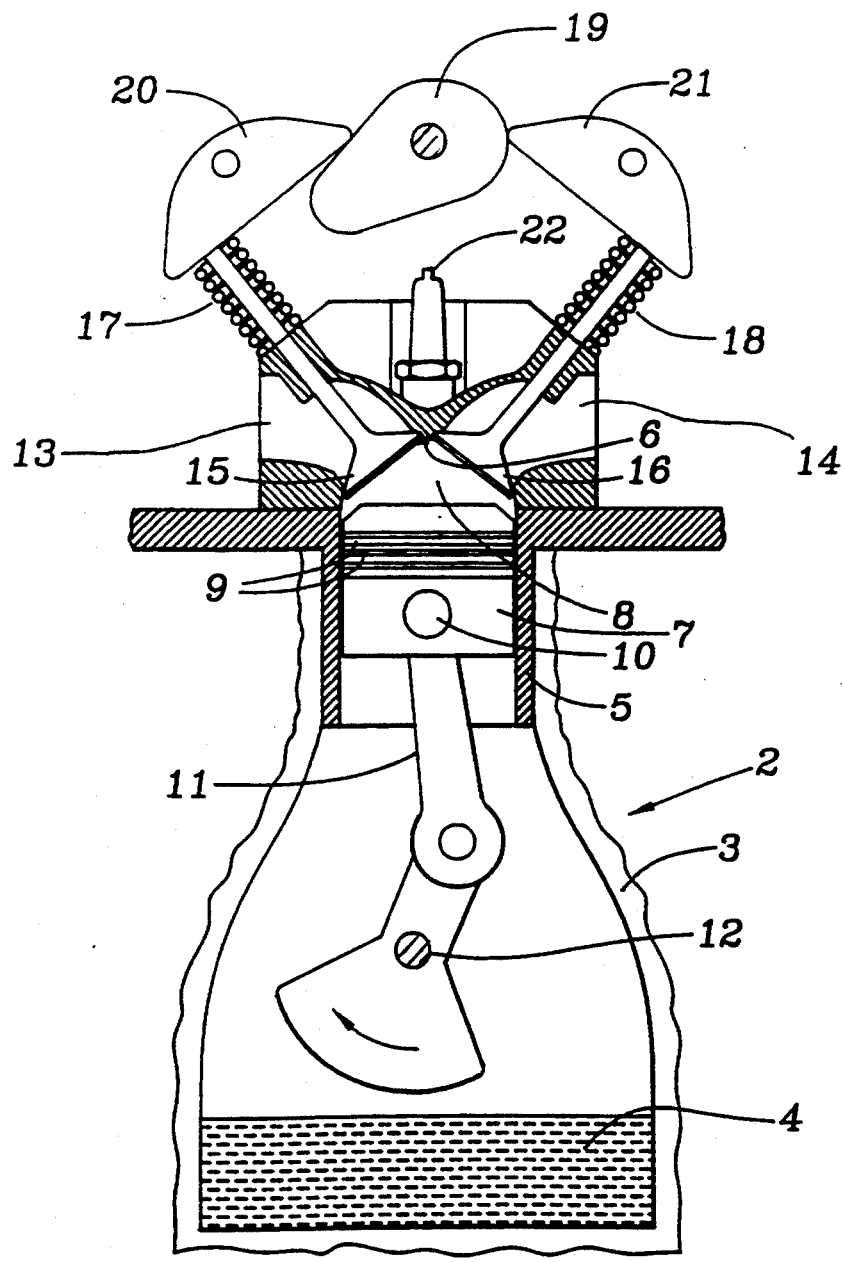

A presently preferred embodiment of the invention is disclosed in the accompanying drawing, wherein:

FIG. 1 is a diagrammatic view of apparatus that is capable of selectively evacuating and pressurizing the cylinders of an internal combustion engine; and FIG. 2 is a sectional, diagrammatic view of a typical reciprocating piston engine cylinder of the kind with which apparatus constructed in accordance with the invention is adapted for use.

THE PREFERRED EMBODIMENTS

Apparatus constructed in accordance with the preferred embodiment of the invention and which is capable of performing the methods of the invention is adapted for use in conjunction with a conventional four cycle internal combustion engine 1 having a plurality of cylinders, one of which is indicated at 2 in FIG. 2 as occupying a position within an engine block 3 having an oil sump 4, a coolant jacket 5, and a cylinder head 6. Reciprocably mounted within the cylinder 2 is a piston 7 which is spaced from the head 6 to provide a variable volume combustion chamber 8 between the cylinder head and the piston, as is conventional. The piston carries a plurality of external rings 9 and has a wrist pin 10 that is coupled by a connecting rod 11 to a rotary crankshaft 12 as is conventional.

In communication with the chamber 8 are a fluid intake passage 13 and an exhaust outlet passage 14. The passages have intake and exhaust ports that are opened and closed by intake and exhaust valves 15 and 16, respectively, which are biased to their closed positions by springs 17 and 18 but are displaceable to their opened positions by a rotary cam shaft 19 which acts on valve actuators 20 and 21. As is conventional, a spark plug 22 is in communication with the combustion chamber 8 to ignite a combustible air/fuel charge within the cylinder.

The engine block 2 conventionally has its valves enclosed by covers 23 and 24, as is indicated in FIG. 1.

Fixed to the crankshaft 12 at one end thereof is a flywheel 25. When the engine is in a vehicle, the shaft 12 is coupled to the transmission. In the disclosed embodiment, however, the shaft 12 is coupled by a conventional coupling 26 to a torque transducer 27 which, in turn, is coupled to a variable speed, preferably electric drive motor 28 by another conventional coupling 29. The opposite end of the drive shaft 12 is fixed to a pulley 30 and such pulley has indicia 31 which enables the angular position of the drive shaft to be determined visually, as is conventional.

The drive motor 28 is coupled to a drive controller 32 of conventional construction which may comprise a known, variable frequency or other suitable device for controlling the speed of the drive motor.

The drive speed controller 32 is programmed by a conventional computer 33. A conventional shaft encoder 34 is coupled to the controller 32 and the computer 33 to enable the angular position of the drive shaft 12 to be determined at all times.

The engine 1 is a conventional, four cycle V-8 engine having a manifold 36 by means of which fluid, such as air, may be delivered via conventional passages 13 to the intake port of each of the cylinders. In the disclosed embodiment the manifold has an inlet 37 that communicates in a conventional manner with the air intake passages of the left bank of cylinders and a second inlet 38 which communicates in a conventional manner with the air intake passages of the right bank of cylinders. The inlets 37 and 38 are connected by conduits 39 and 40, respectively, to a supply line 41 which extends through a reversible fluid or air pump 42 and a filter 43 to atmosphere.

The air pump 42 is driven by a variable speed electric or other motor 44 and is adjustable to enable air to flow in a selected one of two different directions as is indicated by the arrows A and B in FIG. 1. The pressure of air in the manifold 36 may be determined by means of a pressure transducer 45 of known construction that is coupled to the supply line 41. The pressure transducer 45 is capable, as is common, of detecting and measuring pulses generated by changes in pressure in the line 41 resulting from the opening and closing of the intake and exhaust valves and the reciprocation of the piston.

The presence and quantity of lubricating oil is monitored by a conventional pressure transducer 46 that is coupled to the engine by means of a conduit 47. The transducer 46 functions in the usual manner to indicate an adequate or inadequate supply of lubricant.

The exhaust passages at one side of a V-type engine conventionally are connected to an exhaust manifold and the exhaust passages at the opposite side of such engine are connected to another exhaust manifold. When testing an engine according to the invention, however, and because there is a certain overlap in the opening of exhaust valves in a multi-cylinder, four cycle engine, each exhaust manifold is removed and the exhaust passage of each cylinder is connected by its own conduit to a variable restricter or valve which enables the flow of exhaust from or to the combustion chamber of the associated cylinder to be adjusted between full flow, no flow, and any selected rate variation therebetween. For purposes of illustration, the exhaust passages of the left bank of cylinders are indicated in FIG. 1 by the reference characters E1-E4 and the exhaust passages of the right bank of cylinders are designated by the reference characters E5-E8. The respective exhaust passages are coupled by conduits C1-C8 to the respective adjustable restricters R1-R8, and between each exhaust port and the associated restricter is a pressure transducer. These transducers are indicated by the reference characters P1-P8. Each of these pressure transducers is the same and is operable to sense in a well known and common manner pulses caused by pressure changes in the respective conduits.

If it is desired to test the engine 1 with the combustion chamber of each cylinder evacuated, the restricters R1-R8 may be closed and the pump 42 driven by the motor 44 in such direction as to cause air to flow through the pump 42 in the direction of the arrow A. This will cause each combustion chamber to be evacuated and maintained at a subatmospheric pressure. If the drive motor 28 then is operated to drive the crankshaft 12, each of the pistons will reciprocate and the respective intake and exhaust valves 15 and 16 associated with each cylinder alternately will be opened and closed, as is conventional.

Each time an intake valve associated with a particular cylinder is actuated, a pulse or signal will be generated in the line 41 which can be detected and measured by the pressure transducer 45. The signals generated by such pressure changes are delivered in a conventional manner to the computer 33 where they can be monitored and evaluated to determine whether or not the intake and exhaust valves are seating properly and whether the piston rings, and particularly the lowermost oil ring, carried by the piston are functioning properly.

Since the combustion chamber of each cylinder is maintained at a subatmospheric pressure, the air contained in such chamber is minimal. Consequently, movement of the associated piston 7 in its conventional compression stroke has little or no air to compress and the work done by each piston on its compression stroke is negligible. As a result, the engine torque that is measured by means of the torque converter 27 is due almost entirely to the friction attributable to the moving parts of the engine.

Evacuation of each cylinder also makes possible the detection of broken or missing piston compression rings inasmuch as the pressure in each cylinder will increase if air is enabled to enter the combustion chamber as a result of broken or missing piston rings.

If it is desired to pressurize the engine 1 for test purposes, the pump 42 is adjusted to direct air into the intake manifold 36 in the direction of the arrow B and all of the restricters R1-R8 are fully or partially closed. Rotation of the crankshaft 12 by the drive motor 28 will cause the pistons to reciprocate, as usual, but the superatmospheric pressure of air in the combustion chamber of each cylinder will be considerably greater than that which can be attained by operation of the engine under its own power.

As each piston reciprocates, the respective intake and exhaust valves alternately will open and close, thereby generating pulses in the respective conduits C1-C8 which may be sensed and measured by the associated pressure transducer P1-P8. The inducing and maintaining of such superatmospheric pressure in each cylinder as the engine is motored enables higher loads to be imposed on all rotating and reciprocating components, such as the pistons, connecting rods, crankshaft, and bearings than otherwise is possible. As a consequence, the integrity and durability of the valves, camshaft, crankshaft, engine block, cylinder head, and the like easily can be tested to a greater degree than is possible when the engine operates under its own power, and without having to make use of a dynamometer.

Pulses generated in each cylinder in response to the reciprocation of the piston and the opening and closing of the intake and exhaust valves can be sensed by the respective pressure transducers P1-P8 to enable analysis by the computer of the engine and its component parts to be achieved. For example, a decay in the superatmospheric pressure detected by the pressure transducer of any associated cylinder may be indicative of a faulty exhaust valve, broken or missing piston rings, and/or improperly operating valves. Since the air in the cylinders and the conduits C1-C8 is at a pressure considerably higher than that generated under normal conditions when the engine itself is operating under its own power, the detected pressure changes can enable much more sensitive tests to be conducted than otherwise would be the case.

Regardless of whether the engine is motored while the cylinders are evacuated or pressurized, there is no need to remove the spark plugs, nor is there any need to provide fuel and ventilating means for disposing of the exhaust gases, inasmuch as motoring of the engine does not require the combustion of fuel.

Another advantage of apparatus and methods according to the invention is that the elimination of the need to operate an engine under its own power during testing greatly reduces the noise level associated with the testing of an engine operating under its own power.

The disclosed embodiments are representative of presently preferred forms of the invention, but is intended to be illustrative rather than definitive thereof. The invention is defined in the claims.

I claim:

1. Apparatus for use in testing an engine having a cylinder, fluid intake means in communication with said cylinder for delivering fluid to said cylinder, exhaust means in communication with said cylinder for conducting exhaust fluid from said cylinder, a piston reciprocably accommodated in said cylinder, and a rotary shaft coupled to said piston for reciprocating said piston in response to rotation of said shaft, said apparatus comprising fluid pump means for selectively evacuating or pressurizing said cylinder relative to ambient pressure; coupling means for establishing communication between said pump means and said cylinder via said intake means; and drive means for rotating said shaft at a selected rate of speed and reciprocating said piston while said cylinder is in communication with said pump means and while said cylinder is evacuated or pressurized.

2. Apparatus according to claim 1 wherein said pump means is a positive pressure pump.

3. Apparatus according to claim 1 wherein said pump means is a vacuum pump.

4. Apparatus according to claim 1 including valve means in communication with said exhaust means for selectively enabling and disabling exhaust gas flow from said cylinder.

5. Apparatus according to claim 4 wherein said valve means is adjustable for varying the rate of exhaust gas flow from said cylinder.

6. Apparatus according to claim 1 wherein said coupling means comprises a manifold in communication with said intake means and said pump means.

7. Apparatus for use in testing an engine having a plurality of cylinders, intake means in communication with each of said cylinders for delivering fluid to each of said cylinders, exhaust means in communication with each of said cylinders for receiving exhaust fluid from each of said cylinders, a piston reciprocably accommodated in each of said cylinders, and a rotary crank shaft coupled to each of said pistons for reciprocating said pistons in response to rotation of said shaft, said apparatus comprising pump means for selectively evacuating or pressurizing each of said cylinders relative to ambient pressure; coupling means establishing communication between said pump mean and each of said cylinders via the associated intake means; and drive means for rotating said crank shaft at a selected rate of speed and reciprocating each of said pistons while said cylinders are coupled to said pump means and while said cylinders are evacuated or pressurized.

8. Apparatus according to claim 7 wherein said coupling means includes a manifold in communication with the intake means of all of said cylinders.

9. Apparatus according to claim 7 wherein said pump means is a positive pressure pump.

10. Apparatus according to claim 7 wherein said pump means is a vacuum pump.

11. Apparatus according to claim 7 wherein the exhaust means of each of said cylinders is independent of all other of said exhaust means.

12. Apparatus according to claim 7 including adjustable valve means in communication with each of said exhaust means for selectively disabling, enabling, and varying the rate of exhaust flow from each of said cylinders.

13. Apparatus according to claim 7 wherein said drive means comprises motor means.

14. Apparatus according to claim 13 wherein said motor means is variable in speed.

15. Apparatus according to claim 14 including means for varying the speed of said motor means.

16. Apparatus according to claim 7 wherein reciprocation of said pistons effects the generation of pressure signals, and including means for sensing said pressure signals.

17. Apparatus according to claim 16 including means for analyzing said pressure signals.

18. Apparatus according to claim 7 including means coupled to said crankshaft for detecting the angular position thereof.

19. Apparatus according to claim 7 wherein said drive means comprises a variable speed electric motor.

20. Apparatus according to claim 19 including means for varying the speed of said motor.

21. A method of testing an engine having at least one reciprocable piston accommodated in a cylinder having a head spaced from said piston to form a variable volume chamber, an intake port and an exhaust port in communication with said chamber, a rotary shaft coupled to said piston for reciprocating said piston in response to rotation of said shaft, and means for rotating said shaft at a selected rate of speed, said method comprising establishing in said chamber a pressure which selectively is negative or positive relative to ambient pressure; and reciprocating said piston by rotating said shaft at said selected rate of speed while maintaining the negative or positive pressure in said chamber.

22. The method according to claim 21 including restricting the rate of exhaust flow through said exhaust port.

23. The method according to claim 21 including varying the rate or rotation of said shaft and the reciprocation of said piston.

24. The method according to claim 21 including varying the value of said negative or positive pressure.

25. The method according to claim 21 including generating pressure signals downstream of said exhaust port in response to reciprocation of said piston, and sensing and analyzing said signals.

26. The method according to claim 21 wherein said selected pressure is negative.

27. The method according to claim 21 wherein said selected pressure is positive.

28. A method of testing an internal combustion engine having a plurality of cylinders in each of which is a reciprocable piston, each of said cylinders having a head spaced from the associated piston and forming therewith a variable volume chamber, and each of said cylinders having an inlet port and an exhaust port in communication with the associated chamber, a rotary shaft coupled to said pistons for reciprocating said pistons in response to rotation of said shaft, and drive means for rotating said shaft at a selected rate of speed, said method comprising establishing in each of said chambers a selected pressure which is negative or positive relative to ambient pressure; rotating such shaft at said selected speed and reciprocating each of said pistons while maintaining the negative or positive pressure in each of said chambers; generating pressure change signals in response to the reciprocation of each of said pistons; sensing said signals; and analyzing the sensed signals.

29. The method according to claim 28 including varying the rate of rotation of said shaft and the rate of reciprocation of each of said pistons.

30. The method according to claim 28 including controlling the rate of exhaust flow from each of said chambers.

31. The method according to claim 28 including sensing the signals associated with each of said cylinders independently of the signals associated with the other cylinders.

32. The method according to claim 28 wherein the selected pressure in each of said cylinders is negative.

33. The method according to claim 28 wherein the selected pressure in each of said cylinders is positive.

34. The method according to claim 28 including disabling the flow of exhaust through each of said exhaust ports into the associated chamber.

35. The method according to claim 28 including disabling the flow of exhaust through each of said exhaust ports out of the associated chamber.

36. A method of testing an engine having a plurality of cylinders in each of which is a reciprocable piston, each of said cylinders having a head spaced from the associated piston and forming therewith a variable volume chamber, each of said cylinders having an inlet port and an exhaust port in communication with the associated chamber and through which fluid may be admitted to and exhausted from such chamber, a valve associated with each of said ports and movable between opened and closed positions for respectively opening and closing the associated port, a rotary shaft coupled to said pistons and said valves for reciprocating said pistons and effecting periodic opening and closing of said valves in response to rotation of said shaft, and drive means for rotating said shaft at a selected rate of speed, said method comprising establishing in each of said chambers via the associated inlet port a pressure which selectively is negative or positive relative to ambient pressure; rotating said shaft at said selected speed and consequently reciprocating said pistons and opening and closing said valves while maintaining the negative or positive pressure in each of said chambers; generating pressure change signals in response to the reciprocation of each of said pistons and the opening and closing of said valves; sensing said signals; and analyzing the sensed signals.

37. The method according to claim 36 including disabling at all times the exhaust of fluid from each of said chambers through the associated exhaust ports.

38. The method according to claim 36 including disabling at all times the flow of fluid into each of said chambers through the associated exhaust ports.

39. The method according to claim 36 wherein the pressure in said cylinders is negative.

40. The method according to claim 36 wherein the pressure in said cylinders is positive.

* * * * *